(12) United States Patent
Wong et al.

(10) Patent No.: US 6,358,145 B1
(45) Date of Patent: Mar. 19, 2002

(54) BROADCAST SWEEPSTAKES GAME SYSTEM AND GAME PIECE DEVICE

(75) Inventors: Thomas N. Wong, Newport Beach; David Small, San Jose; Brian Farley, Dublin, all of CA (US)

(73) Assignees: Strottman International, Irvine; Shoot The Moon Products II, LLC, Pleasanton, both of CA (US)

( * ) Notice: Subject to any disclaimer, the term of this patent is extended or adjusted under 35 U.S.C. 154(b) by 0 days.

(21) Appl. No.: 09/449,940

(22) Filed: Nov. 29, 1999

(51) Int. Cl.$^7$ .................................................. A63F 9/24
(52) U.S. Cl. ........................... 463/17; 463/40; 463/30; 434/307 R
(58) Field of Search ..................... 463/16, 17, 35, 463/40, 60; 273/237

(56) References Cited

U.S. PATENT DOCUMENTS

| | | | |
|---|---|---|---|
| 4,230,317 A | 10/1980 | Breslow et al. | |
| 4,592,546 A | * 6/1986 | Fascenda et al. | 273/138 A |
| 4,669,730 A | 6/1987 | Small | |
| 4,756,533 A | 7/1988 | Hopkins et al. | |
| 4,815,741 A | 3/1989 | Small | |
| 4,871,176 A | * 10/1989 | Knetzger | 273/237 |
| 5,112,050 A | 5/1992 | Koza et al. | |
| 5,176,380 A | * 1/1993 | Evans et al. | 273/138 A |
| 5,213,337 A | * 5/1993 | Sherman | 273/439 |
| 5,607,357 A | * 3/1997 | Kim et al. | 463/40 |
| 5,709,603 A | * 1/1998 | Kaye | 463/17 |

FOREIGN PATENT DOCUMENTS

CA 454453 2/1949

* cited by examiner

Primary Examiner—Mark Sager
Assistant Examiner—Steven L. Ashburn
(74) Attorney, Agent, or Firm—Richard C. Litman

(57) ABSTRACT

A television, radio, tape, videotape, computer (Internet), telephone, cellular telephone etc., activated sweepstakes game system employing at least one electronically activated game piece device among a large number of similarly dimensioned, configured, textured and weighted dummy game pieces distributed for the sweepstakes game.

8 Claims, 5 Drawing Sheets

BROADCAST SWEEPSTAKES GAME SYSTEM AND GAME PIECE DEVICE

BACKGROUND OF THE INVENTION

1. FIELD OF THE INVENTION

The present invention relates to a television, radio, or Internet activated sweepstakes game system employing at least one active game piece device or token among a large number of dummy game pieces or tokens distributed for the sweepstakes game.

2. DESCRIPTION OF THE RELATED ART

The related art of interest describes various, relatively expensive electronic game pieces, but none discloses the present invention, which is a system utilizing only one or a few active game pieces in a wide distribution of dummy game pieces which respond to an electronic (e.g., television) signal from a suitable device, e.g., a rented videotape. To the eye and touch, all of the game pieces of our invention have the same appearance, feel and mass.

The related art will be discussed in the order of perceived relevance to the present invention.

U.S. Pat. No. 5,112,050 issued on May 12, 1992, to John R. Koza describes a broadcast lottery game device and method comprising a purchased ticket containing a single 9-digit decimal number for comparison with information broadcast in a preferred embodiment from a transmitter station every hour for a year. The broadcast can be transmitted by a hand-held device, e.g., in a casino. The broadcast information contains a winning number which is compared to the stored number of the ticket to determine whether it is a winning ticket depending on the number of matching digits. The transmission means can be also electromagnetic radiation, telephonic, optical and electro-optical mediums, microwave, and laser. The memory devices can be a register, an integrated circuit memory (EPROM preferred), an optical device, or a magnetic memory such as magnetic strips. The electronic system employs a dual tone multi-frequency decoder based on a microprocessor chip with a beeper connected to a microprocessor controller chip and an alphanumeric display. The memory device is distinguishable for lacking the reception of signals from a television set and utilizing expensive electronic systems for each and every device.

U.S. Pat. No. 4,669,730, issued on Jun. 2, 1987, and a continuation-in-part U.S. Pat. No. 4,815,741 issued on Mar. 28, 1989, to Maynard E. Small describes, respectively, (1) an automated sweepstakes-type game apparatus and method, and (2) an automated marketing and gaming system apparatus and method. These patents show an automated sweepstakes game in which an identification card is inserted into an automated remote computer terminal. An account at a subject financial institution is accessed and a sweepstakes processor compares the user to game indicia to determine a winner. The apparatus and method are distinguishable for requiring each identification card to be inserted into bank's computer terminal (ATM), rather than the reception at home from a television set.

U.S. Pat. No. 4,230,317 issued on Oct. 28, 1980, to Jeffrey D. Breslow et al. describes a sound actuated competitive game apparatus comprising a game board playing area and two opposite goal areas. A sound actuated flipper at each goal area can block and propel a playing ball. The players control the flippers by shouting to propel the ball to the opponent's play area. The apparatus is distinguishable for its structural requirement for a playing game board.

U.S. Pat. No. 4,756,533 issued on Jul. 12, 1988, to James E. Hopkins et al. describes a multiple jig-saw puzzle promotional lottery game and method of play. Multiple jig saw puzzles having identical jig saw patterns are simultaneously played by contestants. The puzzle pieces for all the puzzles are obtained from a common pool. Each contestant is challenged to separate the puzzle pieces using only visual clues on their faces, to place the puzzle pieces in the correct places, and to collect all the pieces needed to solve one or more puzzles. The lottery game is distinguishable for not requiring any electromagnetic signal means.

Canadian Pat. No. 454,453 issued on Feb. 8, 1949, to Donald H. Munro describes an indoor hockey game device comprising a rectangular game board with operable flickers to propel the game piece to the opposite goal. The hockey game device is distinguish able for failing to utilize any electromagnetic signal means.

None of the above inventions and patents, taken either singularly or in combination, is seen to describe the instant invention as claimed. Thus, a sweepstakes game piece device solving the problems of ease of play, economical utilization, and widespread distribution via existing commercial channels (products) is desired.

SUMMARY OF THE INVENTION

Our invention is a number of game pieces, played in sweepstakes fashion, utilizing an electronic signal from a common consumer item (e.g., a television set, radio, tape deck, computer, telephone, cellular telephone, etc.) to activate an electronic game token (or "live" piece), and inform the player that he or she is a winner. In a typical sweepstakes, there are but a small number of winners among many losers. The invention calls for the losing tokens to be "dummies" and the winners to be "live", electronic tokens. Thus, this strategy and the invention system allow for the average cost of tokens to be minimal, as only a few tokens are "live." This strategy allows the "live" tokens to be structured to perform complex functions, which is most appealing for marketing purposes, while keeping the total sweepstakes cost at the most conceivable minimum.

The winning piece is a plastic token, an inch or so in diameter and about one-half inch thick, with internal electronics. The other, dummy pieces are identical in external appearance, touch and mass so as to be essentially indistinguishable from the winning piece (s). The game tokens could be distributed in the same fashion as any typical sweepstakes, e.g., by mail, point-of-purchase, manual handout, etc. In the case where a television and VCR provide the electronic activation signal, the tape may have an imbedded, audible signal. The game piece is placed near the speaker of the television connected to the video player. The winning token's internal electronics are activated during the course of the playing of the video, such that a beep, buzz, song, light, flash and/or a spoken message are emitted from the token. The winner then may call a toll-free number, return the token to the place of origin, mail it in, etc., to claim his or her prize. Again, only the winning token or tokens will have the relatively expensive electronics imbedded therein, while all of the other coins in the game are simply monolithic, inexpensive dummies.

Accordingly, it is a principal object of the invention to provide a broadcast sweepstakes game system utilizing an active game piece mixed in with many dummy pieces.

It is another object of the invention to provide a broadcast sweepstakes game utilizing many dummy game pieces.

It is a further object of the invention to provide a broadcast sweepstakes game transmitting the winning signals to the active game piece.

Still another object of the invention is to provide a broadcast sweepstakes game activating the winning token electronically, as from a videotape, a cassette tape, a DVD or laser disk, a radio, a computer (e.g., via the Internet), a telephone, a cellular telephone, etc.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
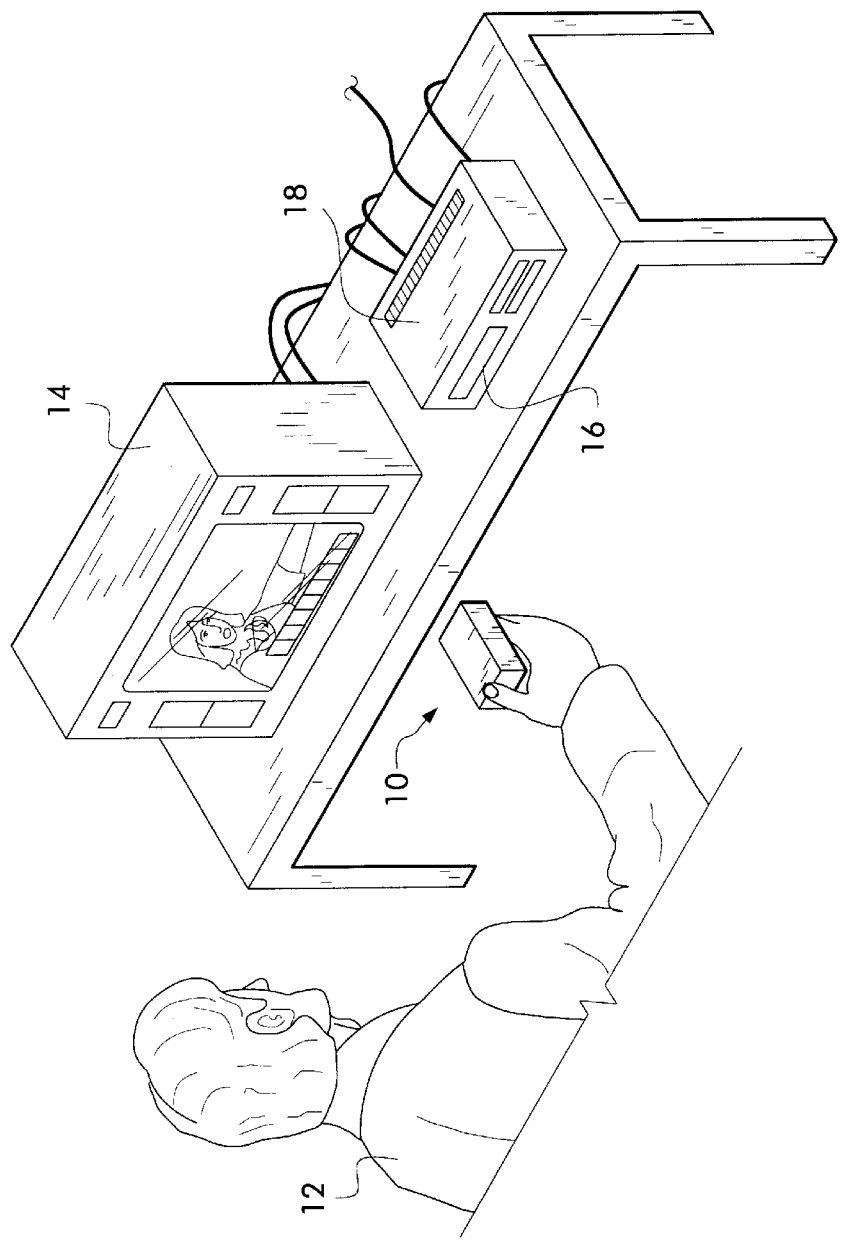
FIG. 1 is an environmental, perspective view of a possible winner holding the sweepstakes game piece device close to the television set while playing a video tape according to the present invention.

The present invention is directed to a sweepstakes game which is economical to employ and requiring the use of an audio signal in a preferred embodiment to activate the winning game token. It is to be understood here that the specific example which follows is only one of a great number of ways to utilize the broad sweepstakes game herein further disclosed and claimed. In FIG. 1, a game piece or token 10 is being held by a person 12 positioned close to a television set 14 playing a video tape 16 (hidden) in a videocassette recorder (VCR) 18. The game piece 10 can be one of many dummy tokens in a sweepstakes contest distributed free of charge with the videotape by a store selling or renting recorded videotapes or that winning real token containing the electronic system which when activated by audio signals from the videotape will notify the winner. The notification can take the form of a beep, buzz, a song, a message, or an illumination. The winner could, for example, take the winning coin and call an toll-free (e.g., 800) telephone number to get further instructions in receiving his/her sweepstakes prize, or reverify winner status.

As with all sweepstakes games, authenticity verification techniques need to be employed to reduce incidences of fraud. Common, and otherwise conventional authenticity techniques such as serialization, hidden watermarks, holographs, etc., would be employed with the invention.

A critical aspect of the invention is to provide dummy tokens having identical size and weight as the winning real tokens, so as to hide the identity of the winning token. The tokens likely will have a shape other than the rectangular block depicted, such as circular, oblong and the like. Equally importantly, each token would be much smaller than the one illustrated at 10; an oversize block or token is illustrated in exaggerated configuration (i.e., a block) and size only for purposes of more adequately illustrating and thus fully understanding the invention.

The economic benefit of utilizing dummy tokens devoid of electronic circuitry yields a substantial savings in promoting the sweepstakes game. Furthermore, other sound media and broadcasting sources such as broadcast television, cable television, radio, movie theaters, the Internet, telephone, and the like can employ the present invention.

The winner activation signal in the preferred embodiment uses a DTMF audio signal encoded onto the audio track of a television signal. The audio track is played either from a recorded medium or broadcast.

The audio trigger signal could be a sequence of specific tones at different times which are detected and verified by the electronics in the token. A spoken word or melody could be used as the activation signal by employing voice recognition as the detector. A low cost speech recognition IC from Sensory, Inc., San Jose, Calif. Part # RSC-164 could replace the preferred embodiment DTMF decoder described above. The audio trigger signal would then be encoded onto the audio portion of the television signal and played from the recorded medium or broadcast. Similarly, the audio signal or DTMF tone, audio tones, melodies or spoken words could be encoded and played or broadcast on audio-only signals, such as audio tapes, CD's, radio signals, telephone signals, cellular telephone signals, etc. The audio trigger signal could easily be generated by a computer and detected by the live token.

The activation signal could also be encoded onto the video portion of a television signal. The "live" active game token would then look at a portion of the video displayed on the CRT using a photodiode or similar device to verify a specific encoded pattern in the video signal.

In summary, there are countless methods to encode and generate a triggering signal. Persons skilled in the art will be able to generate many types of triggering signals.

Figure 2:
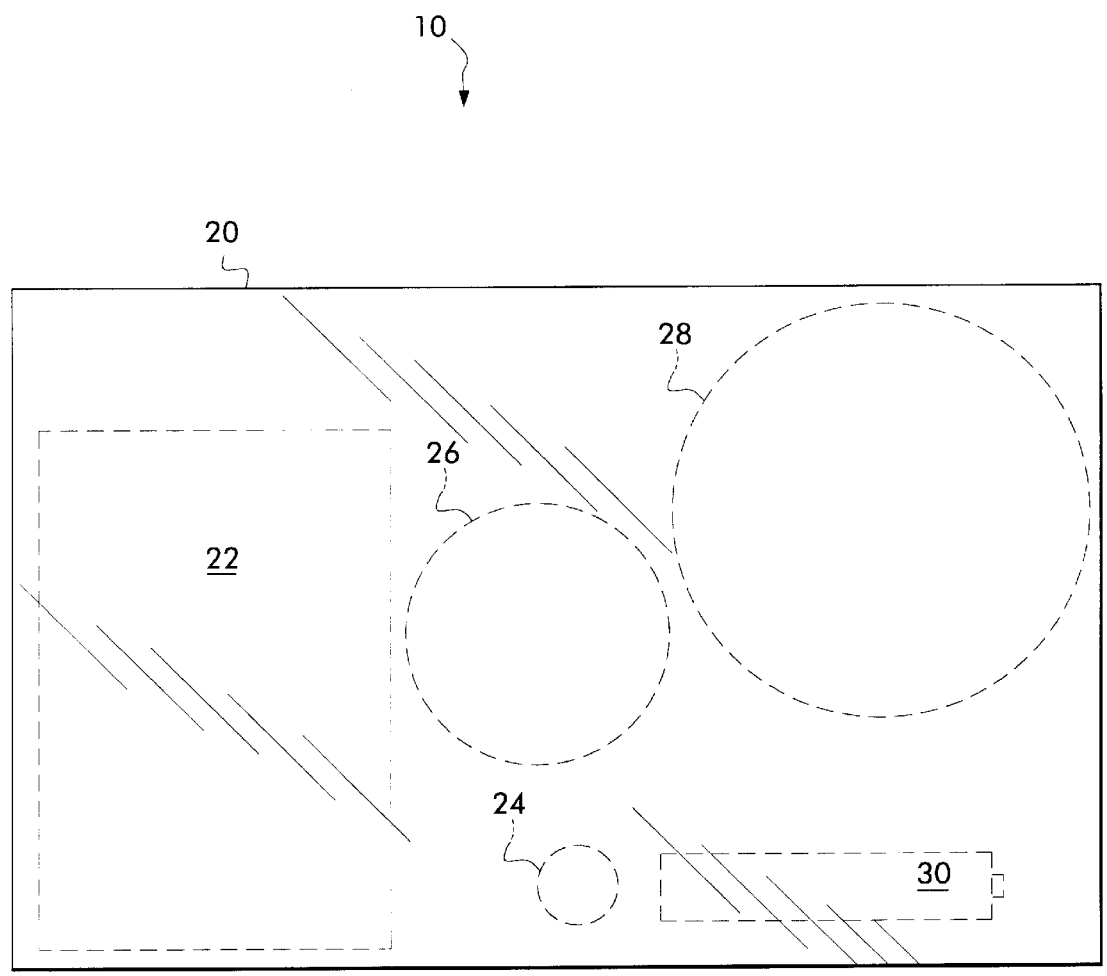
FIG. 2 is a largely diagrammatic, top plan view of the game piece or receiver token.
Figure 3:
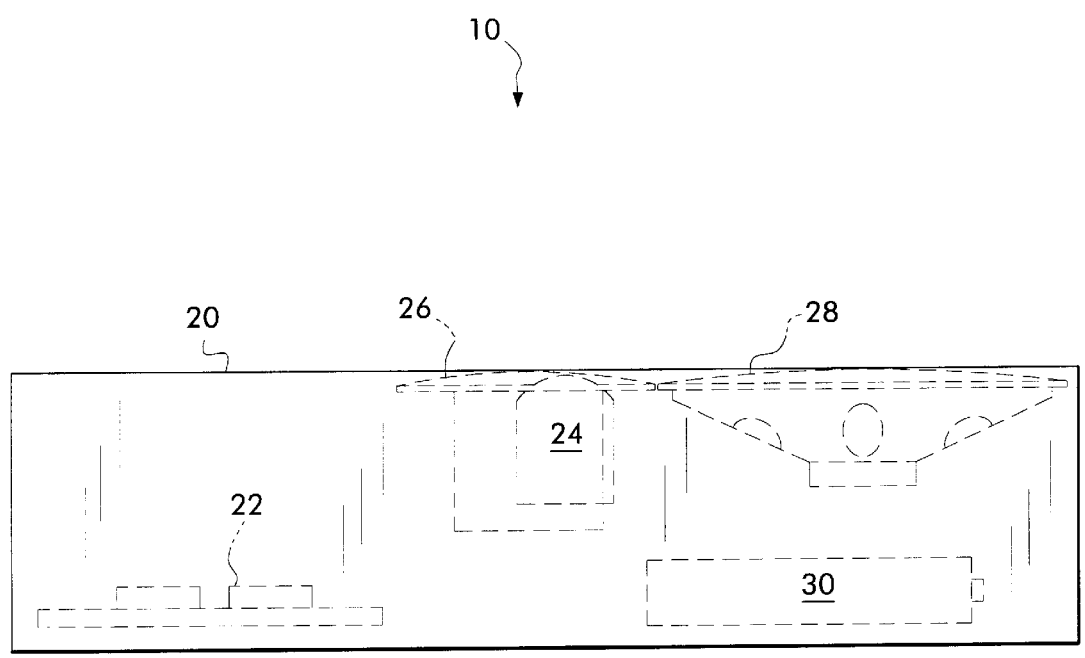
FIG. 3 is a side elevational view of the FIG. 2 game piece or token.

The casings 20 shown in FIGS. 2 and 3, are preferably made of durable inflexible plastic in order that the holder cannot determine whether there is electronic materials within by feel. The casing 20 can be as small as 2.25 in. long, 1.3 in. wide and 0.5 in. thick. A printed circuit board unit 22, an LED (light emitting diode) 24, a microphone 26, a speaker 28, a battery 30, and the required wiring (not shown) are installed in the casing 20. None of the components are visible externally, in order to reduce the cost of the dummies. An LED would glow through translucent plastic. The speaker would be coupled directly to the case in order to generate sound, as would a microphone be coupled to the case to detect the audio triggering signal.

Figure 4:
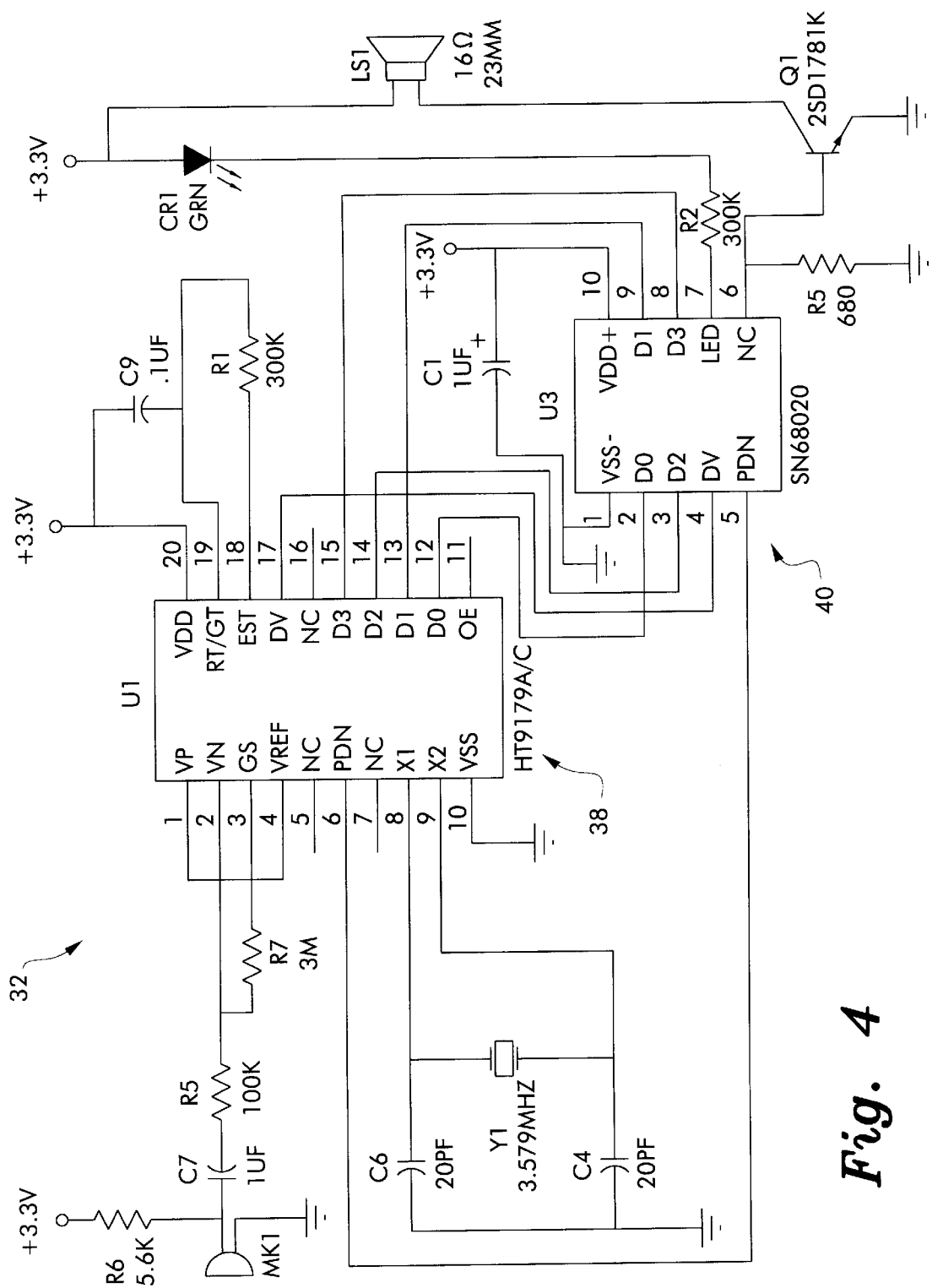
FIG. 4 is schematic diagram of the main electronic circuit in the game piece.
Figure 5:
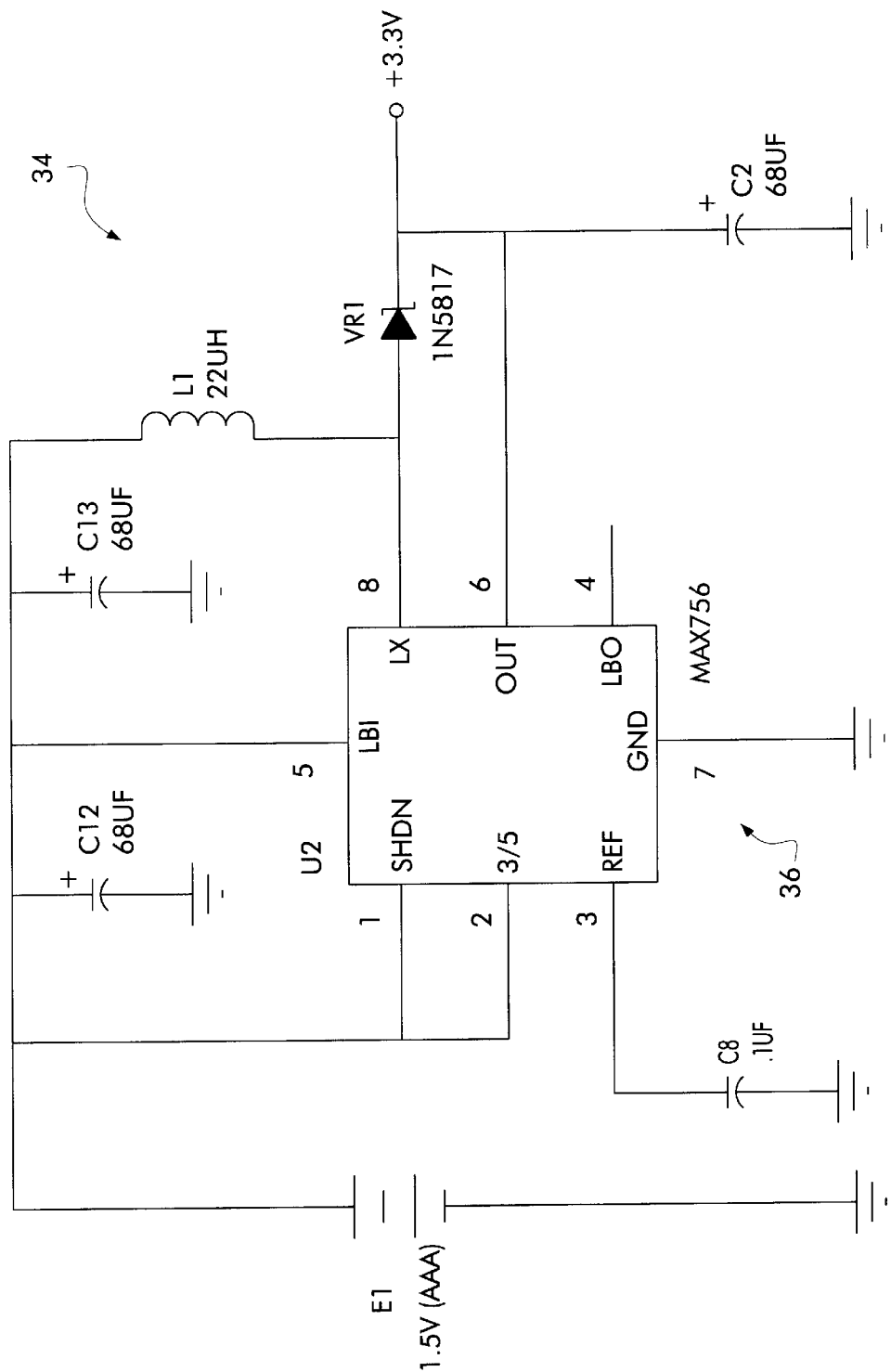
FIG. 5 is a schematic diagram of the voltage multiplier circuit in the game piece.

Turning to FIG. 4, the main circuit 32 is illustrated with the components and respective values listed below in the table.

| Item | Quantity | Reference | Part |
|---|---|---|---|
| 1 | 1 | BT1 | 1 AAA battery |
| 2 | 1 | C1 | 1 µF |
| 3 | 3 | C2, C12, C13 | 68 µF |
| 4 | 2 | C4, C6 | 20P |
| 5 | 1 | C7 | 1 µF |
| 6 | 1 | C8 | 0.1 µF |
| 7 | 1 | C9 | 0.1 µF |
| 8 | 1 | D1 | 1N5817 |
| 9 | 1 | LED1 | GRN |
| 10 | 1 | L1 | 22 µH |
| 11 | 1 | M1 | MIC |

-continued

| Item | Quantity | Reference | Part |
|---|---|---|---|
| 12 | 1 | Q1 | 2SD1781K |
| 13 | 2 | R1, R2 | 300K |
| 14 | 1 | R5 | 680 |
| 15 | 1 | R5 | 100K |
| 16 | 1 | R6 | 5.6K |
| 17 | 1 | R7 | 3.0M |
| 18 | 1 | SPK1 | 16 ohm, 23 mm. |
| 19 | 1 | U1 | HT9179A/C |
| 20 | 1 | U2 | MAX 756 |
| 21 | 1 | U3 | SN68020 |
| 22 | 1 | Z1 | 3.579 MHZ |

Item Quantity Reference Part

| 23 | 1 | CT1 | +battery contact |
|---|---|---|---|
| 24 | 1 | CT2 | −battery contact (with spring) |
| 25 | 6 | WR1–WR6 | wires to speaker, microphone, battery |

The MAX756 device 36 is a voltage multiplier for increasing the voltage output of a single 1.5 volt battery 30 employed. The HT9179A/C device 38 is a dual tone multi-tone frequency decoder (DTMF). Two multi-frequency tones are recorded onto a videotape 16 at specific intervals with respect to each other. When the videotape is played at an appropriate audio level in the VCR 18, the tone decoder 38 will detect the presence of each tone and output a valid tone detection to the SN68020 unit 40 which is a microcontroller processor with voice output capability. The processor 40 seeks the appropriate valid tone input signals from the tone decoder within an appropriate time period and duration. Valid tones will trigger the processor 40 to output an audio file which will voice "You are a winner!" or any other message several times in succession and will blink the LED 24 continuously until the battery 30 dies.

Thus, an economical sweepstakes system and coin device has been shown which saves by not duplicating the winning device and distributing many free dummy devices to encourage participation in the sweepstakes contest. Moreover, the device is distinctive in not requiring wiring to a television set or a videocassette recorder as is common with conventional video game apparatus.

It is to be understood that the present invention is not limited to the embodiments described above, but encompasses any and all embodiments within the scope of the following claims.

We claim:

1. A sweepstakes game system comprising:

a video tape having encoded thereon an audio trigger signal, said video tape being provided by a video rental establishment to a winning customer;

a video cassette recorder for transmitting the trigger signal when said video tape is played by the winning customer of the video rental establishment; and an electronic game piece provided by the video rental establishment, said game piece having circuitry for receiving the trigger signal and including means for indicating reception of the trigger signal to the winning customer while viewing said video tape.

2. A sweepstakes game system according to claim 1, further including a plurality of dummy game pieces provided by the video rental establishment, each of said dummy game pieces being identical in weight and external appearance to said electronic game piece.

3. A sweepstakes game system according to claim 1, wherein said indicating means includes an audio and a visual indicator.

4. A sweepstakes game system according to claim 1, wherein said trigger signal is a dual tone multi-frequency (DTMF) audio signal.

5. A sweepstakes game system according to claim 4, wherein the circuitry of said game piece is powered by a battery and includes a voltage multiplier, a DTMF decoder and a microprocessor with audio output capability.

6. A sweepstakes game system according to claim 5, wherein said indicating means includes a light emitting diode (LED) that flashes until the battery expires.

7. A sweepstakes game system according to claim 5, wherein said microprocessor outputs an audible message upon reception of the trigger signal.

8. A sweepstakes game system according to claim 2, wherein said electronic game piece and each of said dummy game pieces include a plastic casing.

* * * * *